US009696906B1

(12) United States Patent
Bassov et al.

(10) Patent No.: US 9,696,906 B1
(45) Date of Patent: Jul. 4, 2017

(54) STORAGE MANAGEMENT

(71) Applicant: EMC Corporation, Hopkinton, MA (US)

(72) Inventors: Ivan Bassov, Brookline, MA (US); Jean-Pierre Bono, Westborough, MA (US); Miles A. de Forest, Bahama, NC (US); Walter C. Forrester, Berkeley Heights, NJ (US); Samuel L. Mullis, II, Raleigh, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 79 days.

(21) Appl. No.: 14/319,646

(22) Filed: Jun. 30, 2014

(51) Int. Cl.
  *G06F 12/00* (2006.01)
  *G06F 13/00* (2006.01)
  *G06F 13/28* (2006.01)
  *G06F 3/06* (2006.01)

(52) U.S. Cl.
  CPC .......... *G06F 3/0604* (2013.01); *G06F 3/0646* (2013.01); *G06F 3/0689* (2013.01); *G06F 2003/0697* (2013.01)

(58) Field of Classification Search
  CPC .... G06F 3/0601; G06F 3/0604–3/0608; G06F 3/0638; G06F 3/064; G06F 3/0643; G06F 3/0644; G06F 3/0646; G06F 3/0647–3/0652; G06F 3/067; G06F 3/0683–3/0689; G06F 9/50; G06F 9/5011; G06F 9/5016; G06F 9/5061; G06F 9/5077; G06F 11/0745; G06F 11/1448; G06F 12/00; G06F 12/023–12/0246; G06F 13/00; G06F 17/30067; G06F 17/30091; G06F 17/30138; G06F 17/302; G06F 17/30312; G06F 17/30318; G06F 2003/0691; G06F 2003/0692; G06F 2003/0694; G06F 2003/0695; G06F 2003/0697; G06F 2003/0698
  USPC ........................................................ 711/114
  See application file for complete search history.

(56) References Cited

U.S. PATENT DOCUMENTS

| 7,613,896 | B2 * | 11/2009 | Yamamoto | G06F 3/0608 711/114 |
| 8,555,021 | B1 * | 10/2013 | Barturen | G06F 3/061 711/114 |
| 2011/0179132 | A1 * | 7/2011 | Mayo | G06F 9/5077 709/213 |

(Continued)

OTHER PUBLICATIONS

Thin provisioning explained and defined; Stephen J. Bigelow; May 2008; retrieved from http://searchitchannel.techtarget.com/feature/Thin-provisioning-explained-and-defined on Nov. 11, 2015 (7 pages).*

(Continued)

*Primary Examiner* — Daniel C Chappell
(74) *Attorney, Agent, or Firm* — Brian J. Colandreo; Mark H. Whittenberger; Holland & Knight LLP

(57) ABSTRACT

A method, computer program product, and computing system for receiving a storage operation request for a logical storage object. A storage insurance value is associated with the logical storage object. The storage operation request is processed to associate a storage liability value with the storage operation request. Whether the storage operation request should be effectuated is determined based, at least in part, upon the storage liability value and the storage insurance value.

20 Claims, 7 Drawing Sheets

(56) References Cited

U.S. PATENT DOCUMENTS

| | | | | |
|---|---|---|---|---|
| 2013/0024486 A1* | 1/2013 | Patwardhan | ............ | G06F 3/0631 |
| | | | | 707/827 |
| 2013/0332694 A1* | 12/2013 | Reissner | ............... | G06F 3/0644 |
| | | | | 711/172 |
| 2015/0067281 A1* | 3/2015 | Jones | .................. | G06F 12/0284 |
| | | | | 711/156 |

OTHER PUBLICATIONS

Design and Verification of Software-Defined RAID for Hybrid Cloud Storage; Cha et al; 2016 International Conference on Cloud Computing Research and Innovations; May 4-5, 2016; pp. 128-133 (6 pages).*

TotalCOW: Unleash the Power of Copy-On-Write for Thin-provisioned Containers; Wu et al; Proceedings of the 6th Asia-Pacific Workshop on Systems, article No. 15; Jul. 27-28, 2015 (7 pages).*

Revisiting the management control plane in virtualized cloud computing infrastructure; Soundararajan et al; 2013 IEEE International Symposium on Workload Characterization; Sep. 22-24, 2013; pp. 143-152 (10 pages).*

A distributed system design for next generation storage and remote replication; Maruthachalam et al; 2014 Fifth International Conference on the Applications of Digital Information and Web Technologies; Feb. 17-19, 2014; pp. 22-27 (6 pages).*

* cited by examiner

STORAGE MANAGEMENT

TECHNICAL FIELD

This disclosure relates to storage systems and, more particularly, to storage systems that allow for dynamic adjustment of individual LUN storage capacities.

BACKGROUND

Storing, safeguarding and providing access to electronic content is of paramount importance in modern business. Accordingly, sophisticated data storage systems may be employed that provide a high level of flexibility concerning the quantity of storage capacity available to individual users (and individual processes) accessing the data storage system. Unfortunately, such flexibility may result in inefficiencies/conflicts if safeguards are not utilized to ensure proper operation of the data storage system.

SUMMARY OF DISCLOSURE

In one implementation, a computer-implemented method, executed on a computing device, includes receiving a storage operation request for a logical storage object. A storage insurance value is associated with the logical storage object. The storage operation request is processed to associate a storage liability value with the storage operation request. Whether the storage operation request should be effectuated is determined based, at least in part, upon the storage liability value and the storage insurance value.

One or more of the following features may be included. Determining whether the storage operation request should be effectuated may include determining if additional storage insurance is needed to offset, at least in part, the storage liability value. If additional storage insurance is not needed, the storage operation request may be effectuated. If additional storage insurance is needed, whether the additional storage insurance is available from a storage insurance pool associated with the logical storage object may be determined. If the additional storage insurance is available from the storage insurance pool: the additional storage insurance may be obtained from the storage insurance pool; the storage insurance value associated with the logical storage object may be increased based, at least in part, upon the additional storage insurance; and the storage operation request may be effectuated. If the additional storage insurance is not available from the storage insurance pool, the storage operation request may be denied. The logical storage object may be chosen from a group consisting of a thin LUN and a thick LUN.

In another implementation, a computer program product resides on a computer readable medium that has a plurality of instructions stored on it. When executed by a processor, the instructions cause the processor to perform operations including receiving a storage operation request for a logical storage object. A storage insurance value is associated with the logical storage object. The storage operation request is processed to associate a storage liability value with the storage operation request. Whether the storage operation request should be effectuated is determined based, at least in part, upon the storage liability value and the storage insurance value.

One or more of the following features may be included. Determining whether the storage operation request should be effectuated may include determining if additional storage insurance is needed to offset, at least in part, the storage liability value. If additional storage insurance is not needed, the storage operation request may be effectuated. If additional storage insurance is needed, whether the additional storage insurance is available from a storage insurance pool associated with the logical storage object may be determined. If the additional storage insurance is available from the storage insurance pool: the additional storage insurance may be obtained from the storage insurance pool; the storage insurance value associated with the logical storage object may be increased based, at least in part, upon the additional storage insurance; and the storage operation request may be effectuated. If the additional storage insurance is not available from the storage insurance pool, the storage operation request may be denied. The logical storage object may be chosen from a group consisting of a thin LUN and a thick LUN.

In another implementation, a computing system includes at least one processor and at least one memory architecture coupled with the at least one processor, wherein the computing system is configured to perform operations including receiving a storage operation request for a logical storage object. A storage insurance value is associated with the logical storage object. The storage operation request is processed to associate a storage liability value with the storage operation request. Whether the storage operation request should be effectuated is determined based, at least in part, upon the storage liability value and the storage insurance value.

One or more of the following features may be included. Determining whether the storage operation request should be effectuated may include determining if additional storage insurance is needed to offset, at least in part, the storage liability value. If additional storage insurance is not needed, the storage operation request may be effectuated. If additional storage insurance is needed, whether the additional storage insurance is available from a storage insurance pool associated with the logical storage object may be determined. If the additional storage insurance is available from the storage insurance pool: the additional storage insurance may be obtained from the storage insurance pool; the storage insurance value associated with the logical storage object may be increased based, at least in part, upon the additional storage insurance; and the storage operation request may be effectuated. If the additional storage insurance is not available from the storage insurance pool, the storage operation request may be denied. The logical storage object may be chosen from a group consisting of a thin LUN and a thick LUN.

The details of one or more implementations are set forth in the accompanying drawings and the description below. Other features and advantages will become apparent from the description, the drawings, and the claims.

DETAILED DESCRIPTION OF THE PREFERRED EMBODIMENTS

Figure 1:
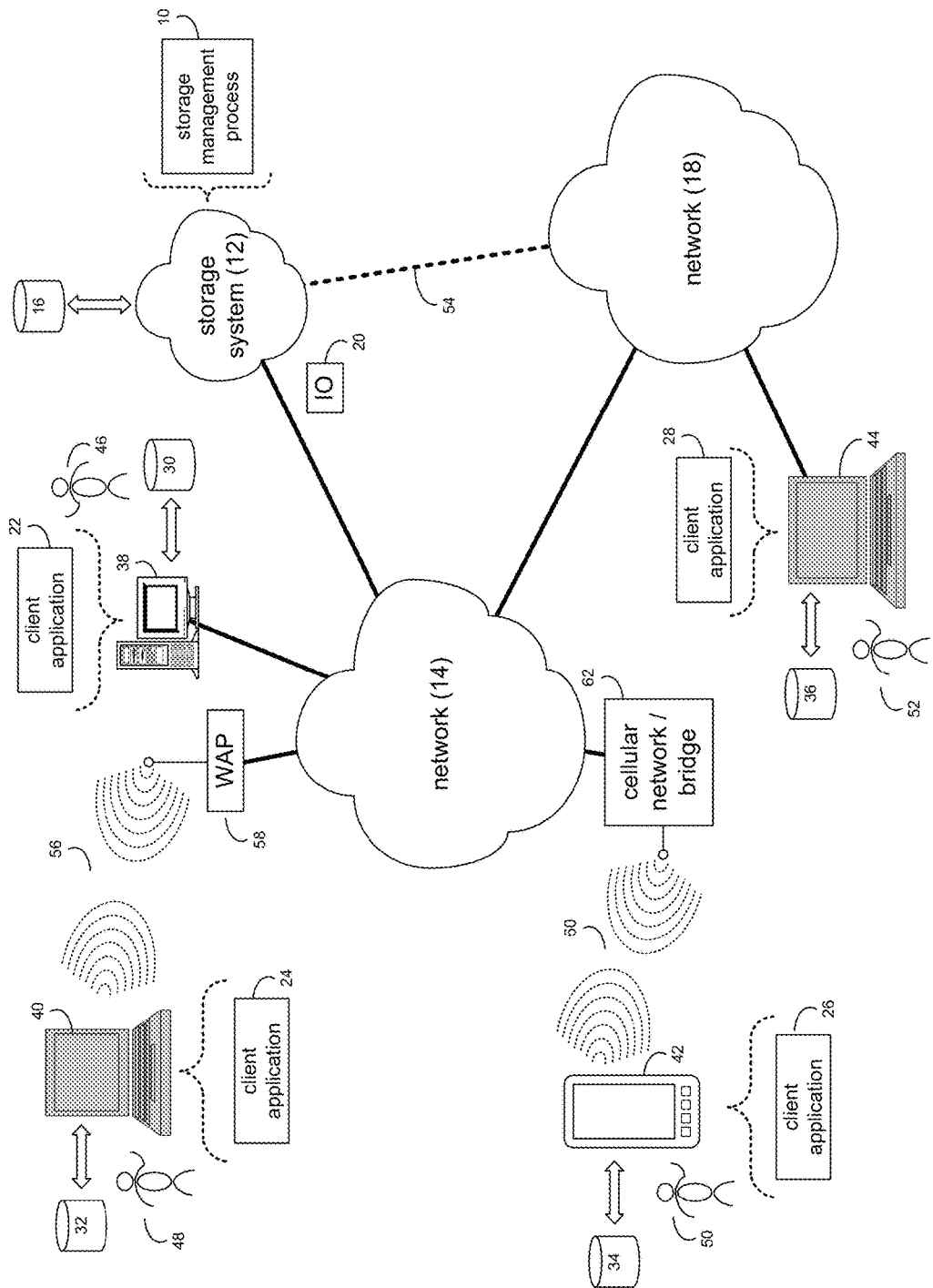
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Novell Netware™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smart phone 42, notebook computer 44, a server (not shown), a smart television (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smart phone 42 is shown wirelessly coupled to network 14 via wireless communication channel 60 established between smart phone 42 and cellular network/bridge 62, which is shown directly coupled to network 14.

Client electronic devices 38, 40, 42, 44 may each execute an operating system, examples of which may include but are not limited to Microsoft Windows™, Microsoft Windows CE™, Redhat Linux™, or a custom operating system.

As discussed above, the instruction sets and subroutines of storage management process 10, which may be stored on storage device 16 included within storage system 12, may be executed by one or more processors (not shown) and one or more memory architectures (not shown) included within storage system 12. Further and as discussed above, storage system 12 may be coupled to network 14 and/or network 18.

Figure 2:
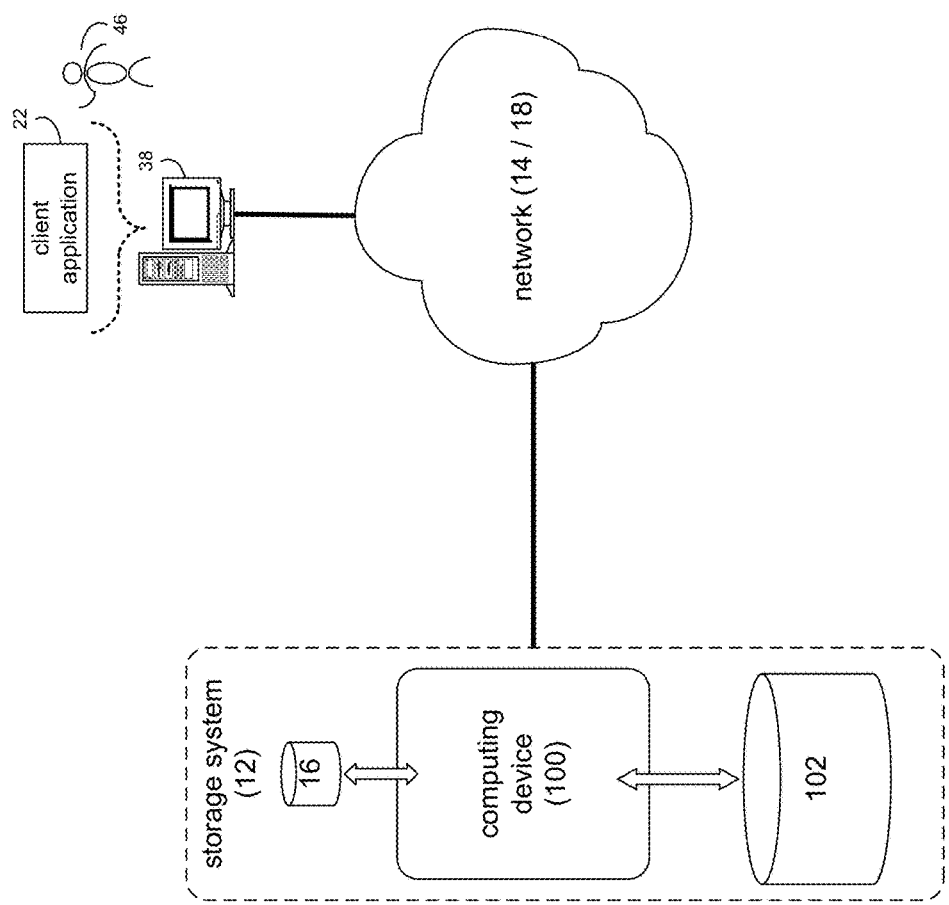
FIG. 2 is a diagrammatic view of the storage system of FIG. 1.

The Storage Management Process:

Referring also to FIG. 2, there is shown one illustrative example of storage system 12 coupled to (in this illustrative example) networks 14 and/or network 18. As discussed above, examples of storage system 12 may include a SAN, wherein a SAN may include one or more of a personal computer, a server computer, a series of server computers, a mini computer, a mainframe computer, a RAID device and a NAS system.

Computing device 100 included within storage system 12 is an illustrative example of such a personal computer, a server computer, a series of server computers, a mini computer, a mainframe computer, a RAID device and a NAS system, wherein computing device 100 may be configured to interface with network accessible storage 102 (which may be included within storage system 12).

Figure 3:
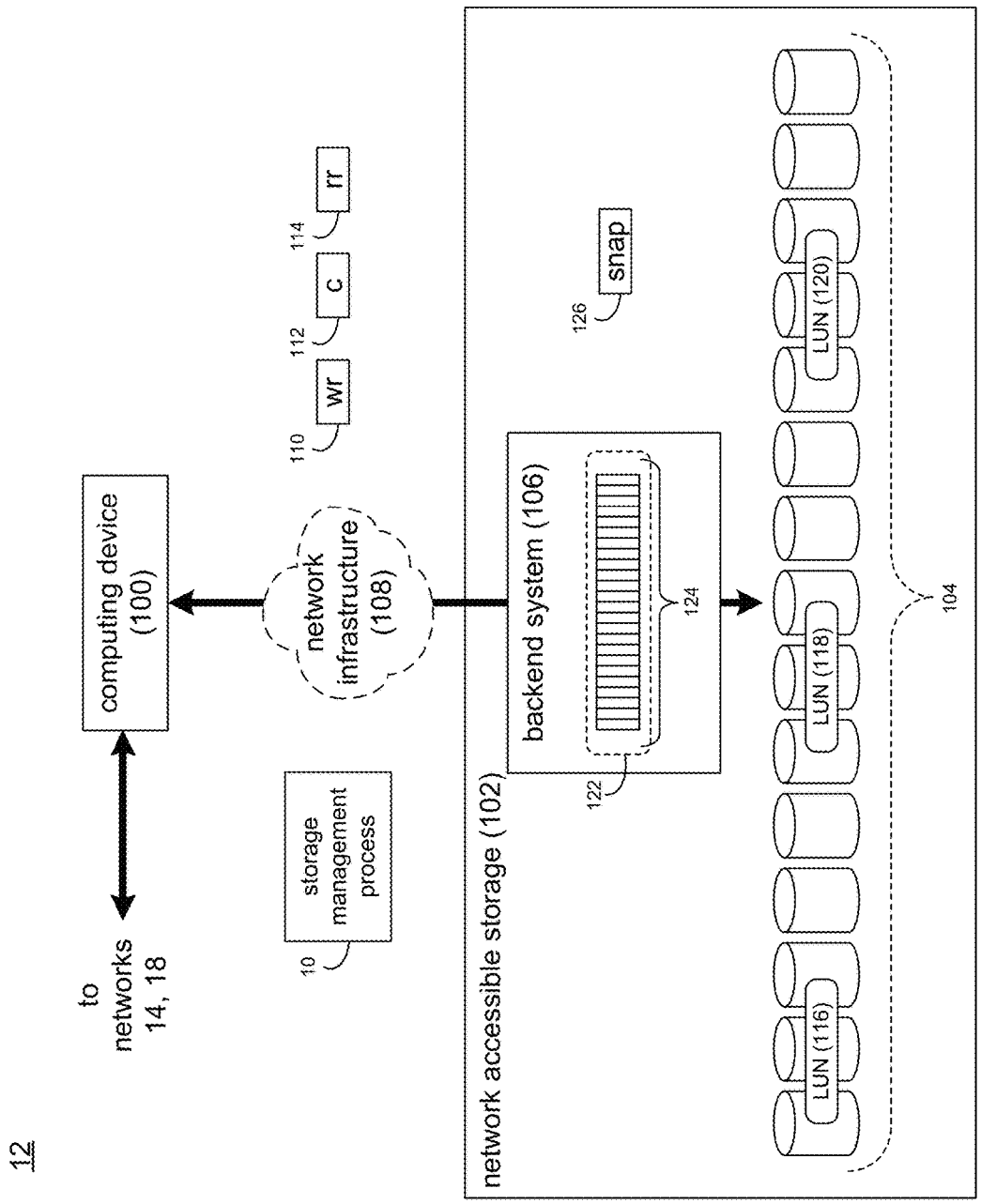
FIG. 3 is a more-detailed diagrammatic view of the storage system of FIG. 1.

Referring also to FIG. 3, there is shown a more detailed view of storage system 12 generally (and network accessible storage 102 specifically). In this example, network accessible storage 102 is shown to include plurality of storage targets 104. The quantity of storage targets included within plurality of storage targets 104 may be increased or decreased depending upon e.g. the level of redundancy/performance/capacity required.

Plurality of storage targets 104 may be configured to provide various levels of performance and/or high availability. For example, a portion of plurality of storage targets 104 may be configured as a RAID 0 array, in which data is striped across storage targets. By striping data across a plurality of storage targets, improved performance may be realized. However, RAID 0 arrays do not provide a level of high availability. Accordingly, a portion of plurality of storage targets 104 may be configured as a RAID 1 array, in which data is mirrored between storage targets. By mirroring data between storage targets, a level of high availability is achieved as multiple copies of the data are stored within network accessible storage 102.

While plurality of storage targets 104 is discussed above as being configured in a RAID 0 or RAID 1 array, this is for illustrative purposes only and is not intended to be a limitation of this disclosure, as other configurations are possible. For example, plurality of storage targets 104 may be configured as a RAID 3, RAID 4, RAID 5 or RAID 6 array.

Plurality of storage targets 104 may include one or more coded targets. As is known in the art, a coded target may be used to store coded data that may allow for the regeneration of data lost/corrupted on one or more of plurality of storage targets 104. An example of such a coded target may include but is not limited to a hard disk drive that is used to store parity data within a RAID array. The quantity of coded targets included within plurality of storage targets 104 may be increased or decreased depending upon e.g. the level of redundancy/performance/capacity required.

Examples of plurality of storage targets 104 may include one or more electro-mechanical hard disk drives and/or solid-state/Flash devices, wherein the combination of plurality of storage targets 104 and processing/control systems (e.g., backend system 106) may form network accessible storage 102.

Further, the various storage targets included within plurality of storage targets 104 may be configured to provide different levels of performance. For example, a first group of storage targets within plurality of storage targets 104 may be flash-based storage targets that are configured to provide high-level performance & low-level capacity. Further, a second group of storage targets within plurality of storage targets 104 may be SAS-based storage targets that are configured to provide mid-level performance & mid-level capacity. Additionally, a third group of storage targets within plurality of storage targets 104 may be NL/SAS-based storage targets that are configured to provide low-level performance & high-level capacity.

The manner in which storage system 12 is implemented may vary depending upon e.g. the level of redundancy/performance/capacity required. For example, storage system 12 may be a RAID device in which computing device 100 is a RAID controller card and plurality of storage targets 104 are individual "hot-swappable" hard disk drives. An example of such a RAID device may include but is not limited to an NAS device. Alternatively, storage system 12 may be configured as a SAN, in which computing device 100 may be e.g., a server computer and each of plurality of storage targets 104 may be a RAID device and/or computer-based hard disk drive. Further still, one or more of plurality of storage targets 104 may be a SAN.

In the event that storage system 12 is configured as a SAN, the various components of storage system 12 (e.g. computing device 100 and network accessible storage 102) may be coupled using network infrastructure 108, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to first computing device 100, may be executed by one or more processors (not shown) and one or more memory architectures (not shown) included within computing device 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when computing device system 100 is configured as an application server, these IO requests may be internally generated within computing device 100. Examples of IO request 20 may include but are not limited to data write request 110 (i.e. a request that content 112 be written to storage system 12) and data read request 114 (i.e. a request that content 112 be read from storage system 12).

During operation of computing device 100, content 112 to be written to storage system 12 may be processed by computing device 100. Additionally/alternatively and when computing device 100 is configured as an application server, content 112 to be written to storage system 12 may be internally generated by computing device 100.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on computing device 100, some or all of the instruction sets and subroutines of storage management process 10 may be executed by one or more processors (not shown) and one or more memory architectures (not shown) included within backend system 106 of network accessible storage 102.

While the following discussion concerns LUNs, this is for illustrative purposes only and is not intended to be a limitation of this disclosure, as other configurations are possible. For example, storage management process 10 may be configured to work with any form of virtual storage object, examples of which may include but are not limited to block objects (such as Logical Unit Number (LUN) storage objects) and file objects (such as Common Internet File System (CIFS) storage objects and Network File System (NFS) storage objects).

Each of plurality of storage targets 104 may be subdivided into smaller subportions called memory blocks (e.g., a 512 kilobyte unit of data storage), wherein these memory blocks may be grouped together to form LUNs (i.e., logical storage units) of storage within network accessible storage 102. As is known in the art, a LUN is a logical storage unit that is mapped to and defines physical storage space within physical storage devices (e.g., one or more of plurality of storage targets 104). For example, a first portion of these memory blocks may be mapped to form LUN 116; a second portion of these memory blocks may be mapped to form LUN 118; and a third portion of these memory blocks may be mapped to form LUN 120.

The size of these LUNs (e.g., LUNs 116, 118, 120) may be increased/decreased depending upon need. For example, if LUN 116 is assigned to user 46 and user 46 needs additional storage space, storage management process 10 may add additional memory blocks to LUN 116 to increase the size of LUN 116. Conversely, if LUN 118 is assigned to user 48 and user 48 needs less storage space, storage management process 10 may remove memory blocks from LUN 118 to decrease the size of LUN 118.

The LUNs defined by storage management process 10 (e.g., LUNs 116, 118, 120) may be thinly provisioned (e.g., a thin LUN) or thickly provisioned (e.g., a thick LUN). For example, if LUN 116 is a thinly provisioned LUN, storage management process 10 may define a maximum size for LUN 116, wherein LUN 116 initially has zero memory blocks assigned to it. As (in this example) user 46 stores data on LUN 116, storage management process 10 may assign memory blocks to LUN 116 to accommodate the storage of data (e.g., up to the maximum size defined for LUN 116). Further, as user 46 deletes data from LUN 116, storage management process 10 may remove (i.e., unassign) memory blocks from LUN 116, so that storage management process 10 may use such unassigned memory block for other LUNs.

Conversely, if LUN 118 is thickly provisioned, storage management process 10 may define a maximum size for LUN 118, wherein LUN 118 is initially assigned the appropriate quantity of memory blocks to define the maximum storage capacity of the LUN. Accordingly, storage management process 10 may permanently assign enough memory blocks to LUN 118 to accommodate the maximum defined storage for LUN 118 (regardless of the amount of storage actually being used by LUN 118).

Due to the dynamic way in which memory blocks may be assigned to various LUNs defined within network accessible storage 102, storage management process 10 may utilize various processes to ensure that memory blocks are available to LUNs that have guaranteed quantities of storage (e.g., the above-described thickly provisioned LUNs).

Accordingly, storage management process 10 may maintain a storage insurance pool (e.g., storage insurance pool 122) within backend system 106, wherein storage insurance pool 122 includes entries 124 that associate the various memory blocks included within plurality of storage targets 104 with the various LUNs to which they are assigned. Accordingly, in the event that a LUN (e.g., LUN 118) is thickly provisioned and needs 1,000 memory blocks to achieve it maximum capacity, these 1,000 memory blocks may be defined within storage insurance pool 122 as being reserved for LUN 118. Conversely, if a thinly provisioned LUN (e.g., LUN 116) needs additional memory blocks (due to a higher level of storage utilization), storage management process 10 may process storage insurance pool 122 to determine which (if any) memory blocks are available for use by LUN 116. Further, if a thinly provisioned LUN (e.g., LUN 116) needs fewer memory blocks (due to a lower level of storage utilization), storage management process 10 may process storage insurance pool 122 to identify these memory blocks that are no longer needed by LUN 116 as being available for use by other LUNs.

While, in this particular example, one storage insurance pool is shown (namely storage insurance pool 122), it is understood that the quantity of storage insurance pools may be increased depending upon need and design criteria (e.g., for an accounting storage insurance pool, a legal storage insurance pool, a development storage insurance pool).

Figure 4:
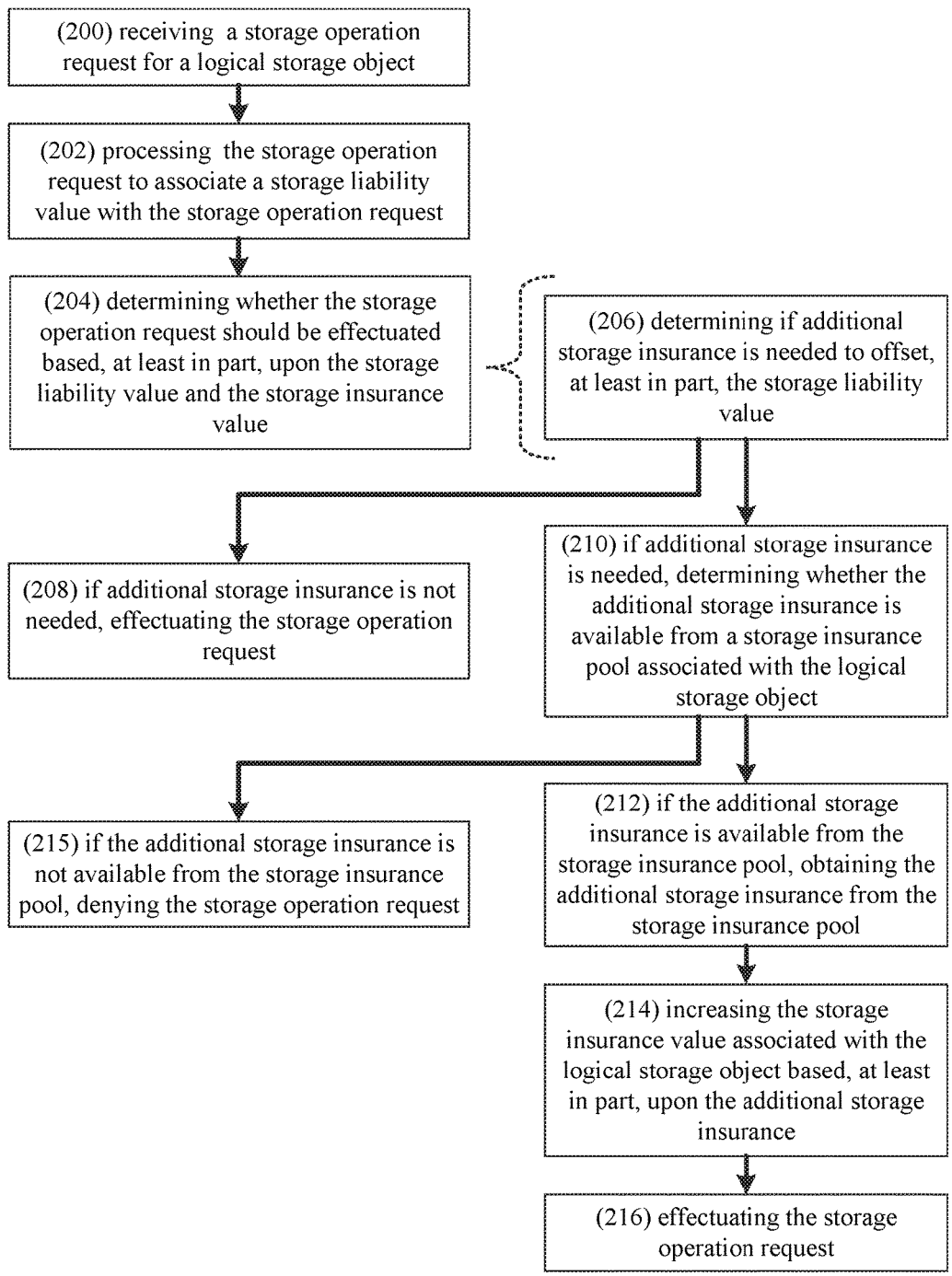
FIG. 4 is a flow chart of one implementation of the storage management process of FIG. 1.

Referring also to FIG. 4, assume that storage management process 10 receives 200 a storage operation request (e.g., write request 110) requesting that content 112 be written to a particular LUN. As discussed above, each LUN (when defined) has a storage insurance value associated with it. For example, if the LUN in question is a thick LUN (LUN 118), storage insurance pool may define enough memory blocks (e.g., 1,000 memory blocks) to accommodate the maximum capacity of the LUN in question. Accordingly, the insurance value for LUN 118 may be 1,000 memory blocks. Conversely, if the LUN in question is a thinly provisioned LUN (LUN 116), storage insurance pool 122 may have zero memory blocks assigned to it, as memory blocks are assigned to thinly provisioned LUNs on an as-needed basis. Accordingly, the insurance value for LUN 116 may be zero memory blocks.

As will be explained below via various examples, storage management process 10 may process 202 the storage operation request (e.g., write request 110) to associate a storage liability value with the storage operation request (e.g., write request 110) and may determine 204 whether the storage operation request (e.g., write request 110) should be effectuated based, at least in part, upon the storage liability value of the storage operation request (e.g., write request 110) and the storage insurance value of the LUN to be written to. For the following examples, assume that one memory block is needed to accommodate one unit of storage.

Example #1

Assume for this example, that the LUN to be written to is a thick LUN (e.g., LUN 118) having a maximum storage capacity of one-thousand memory blocks, of which five-hundred memory blocks are currently being utilized. Since this is a thick LUN, when this LUN was defined by storage management process 10, LUN 118 had an insurance value of one-thousand memory blocks.

Assume for illustrative purposes that storage management process 10 receives 200 a storage operation request (e.g., write request 110) requesting that three-hundred units of storage be written to LUN 118. Accordingly, storage management process 10 may process 202 the storage operation request (e.g., write request 110) to associate a storage liability value with the storage operation request (e.g., write request 110). In this example, the storage liability value is three-hundred units of storage.

Storage management process 10 may then determine 204 whether the storage operation request (e.g., write request 110) should be effectuated based, at least in part, upon the storage liability value (e.g., three-hundred units of storage) of the storage operation request (e.g., write request 110) and the storage insurance value of LUN 118. In this particular example, the storage insurance value of LUN 118 is one-thousand memory blocks (i.e., total capacity of LUN 118)—five-hundred memory blocks (i.e., memory blocks currently being utilized by LUN 118). Accordingly, the currently available insurance value of LUN 118 is five-hundred memory blocks (i.e., the total number of memory blocks still available for use by LUN 118).

When determining 204 whether the storage operation request (e.g., write request 110) should be effectuated, storage management process 10 may determine 206 if additional storage insurance is needed to offset, at least in part, the storage liability value. Since, in this example, the currently available insurance value of LUN 118 is five-hundred memory blocks and the storage liability value is three-hundred units of storage, storage management process 10 may determine 206 that no additional storage insurance is needed. Since no additional storage insurance is not needed, storage management process 10 may effectuate 208 the storage operation request (e.g., write request 110) and write the three-hundred units of storage to (in this example) three-hundred memory blocks (of the remaining five-hundred memory blocks) that are assigned to LUN 118.

Example #2

Assume for this example, that the LUN to be written to is also a thick LUN (e.g., LUN 118) having a maximum storage capacity of one-thousand memory blocks, of which five-hundred memory blocks are currently being utilized. Since this is a thick LUN, when this LUN was defined by storage management process 10, LUN 118 had an insurance value of one-thousand memory blocks.

Assume for illustrative purposes that storage management process 10 receives 200 a storage operation request (e.g., write request 110) requesting that seven-hundred units of storage be written to LUN 118. Accordingly, storage management process 10 may process 202 the storage operation request (e.g., write request 110) to associate a storage liability value with the storage operation request (e.g., write request 110). In this example, the storage liability value is seven-hundred units of storage.

Storage management process 10 may then determine 204 whether the storage operation request (e.g., write request 110) should be effectuated based, at least in part, upon the storage liability value (e.g., seven-hundred units of storage) of the storage operation request (e.g., write request 110) and the storage insurance value of LUN 118. In this particular example, the storage insurance value of LUN 118 is one-thousand memory blocks (i.e., total capacity of LUN 118)— five-hundred memory blocks (i.e., memory blocks currently being utilized by LUN 118). Accordingly, the currently available insurance value of LUN 118 is five-hundred memory blocks (i.e., the total number of memory blocks still available for use by LUN 118).

When determining 204 whether the storage operation request (e.g., write request 110) should be effectuated, storage management process 10 may determine 206 if additional storage insurance is needed to offset, at least in part, the storage liability value. Since, in this example, the currently available insurance value of LUN 118 is five-hundred memory blocks and the storage liability value is seven-hundred units of storage, storage management process 10 may determine 206 that additional storage insurance (e.g., two-hundred memory blocks) is needed. Since additional storage insurance is needed, storage management process 10 may determine 210 whether the additional storage insurance (e.g., two-hundred memory blocks) is available from storage insurance pool 122 associated with LUN 118. As LUN 118 has a maximum defined storage capacity of one-thousand memory blocks and the additional storage insurance would expand the storage capacity of LUN 118 to twelve-hundred memory blocks, storage management process 10 may determine 210 that the requested additional storage insurance is not available from storage insurance pool 122 and storage management process 10 may deny 215 the storage operation request (e.g., write request 110).

Snapshots:

A snapshot is a point-in-time backup operation that storage management process 10 may perform on various objects (e.g., a LUN or a file system). A snapshot (e.g., snapshot 126) in general terms saves differential data between the current status of a an object and the status of the the object at the time that the snapshot was made.

Figure 5A:
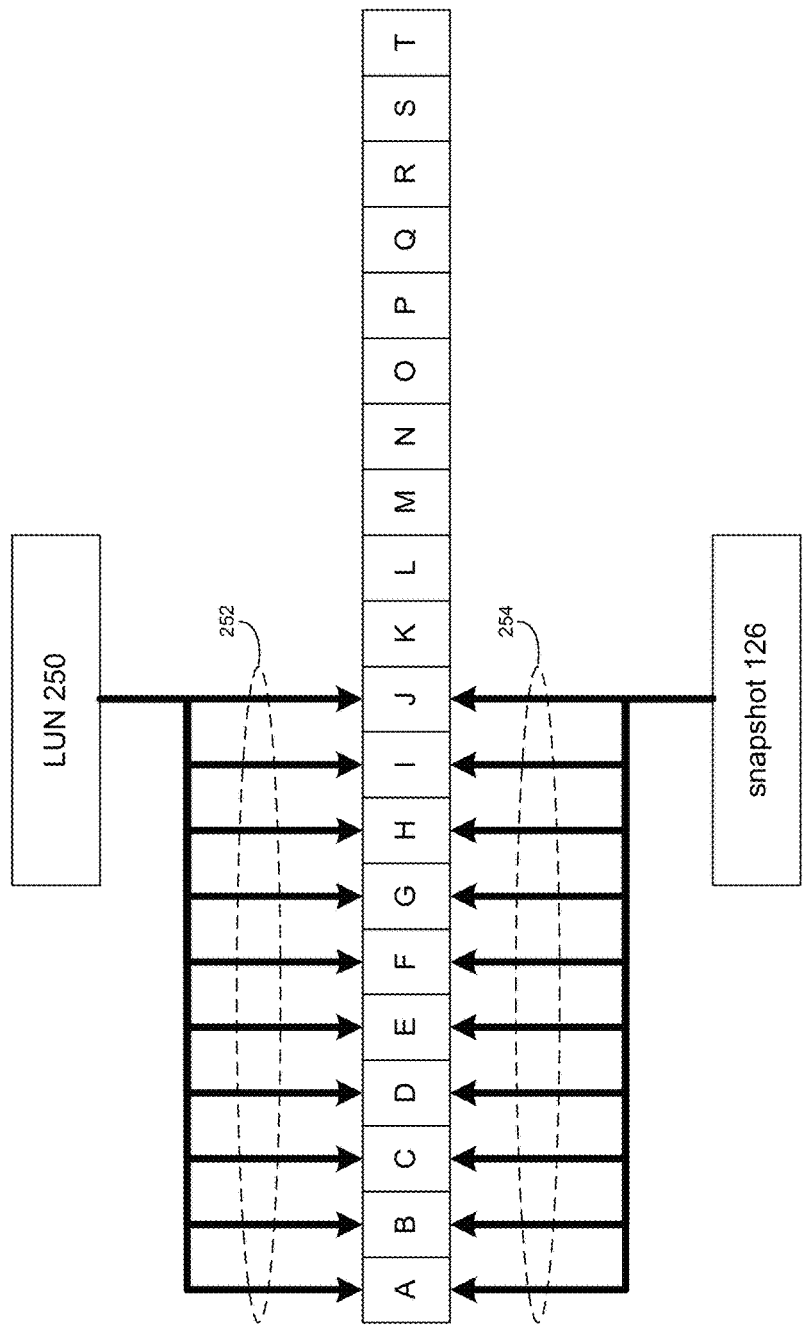
FIGS. 5A-5C are diagrammatic views of LUN pointers and snapshot pointers.

Referring also to FIG. 5A and as discussed above, a LUN is simply a collection of memory blocks. Therefore and for this illustrative example, assume that LUN 250 includes a plurality of pointers (e.g., pointers 252) that point to the memory blocks that are assigned to LUN 250. Assume for illustrative purposes that LUN 250 is a thin LUN and storage management process 10 assigns LUN 250 a maximum storage capacity of twenty memory blocks (e.g., memory blocks A-T). Assume further that only ten of those twenty memory blocks are currently being utilized (e.g., memory blocks A-J). Accordingly, LUN 250 may define ten pointers (e.g., pointers 252) that locate the ten memory blocks (e.g., memory blocks A-J) currently assigned to and being utilized by LUN 250. As this is a thin LUN, if additional memory blocks (up to the maximum of twenty memory blocks) are added to LUN 250, additional pointers may be defined by storage management process 10 for LUN 250 that locate those newly-added memory blocks. Conversely, if memory blocks are removed from LUN 250, the pointers locating those newly-removed memory blocks may also removed from LUN 250.

A snapshot (e.g., snapshot 126) functions in a very similar way. At the time that e.g., snapshot 126 in generated by storage management process 10, snapshot 126 includes a plurality of pointers (e.g., pointers 254) that point to the memory blocks (e.g., memory blocks A-J) associated with snapshot 126. Further and at the time that snapshot 126 was generated, the pointers defined within LUN 250 (e.g., pointers 252) and the pointers defined within snapshot 126 (e.g., pointers 254) may point to the same memory blocks (e.g., memory blocks A-J), as there is only one set of data and the data pointed to by snapshot 126 is currently the same as the data pointed to by LUN 250. However, as the data currently stored within LUN 250 is overwritten and/or added to, pointers 252 defined for LUN 116 and pointers 254 defined for snapshot 126 may begin to diverge.

Figure 5B:
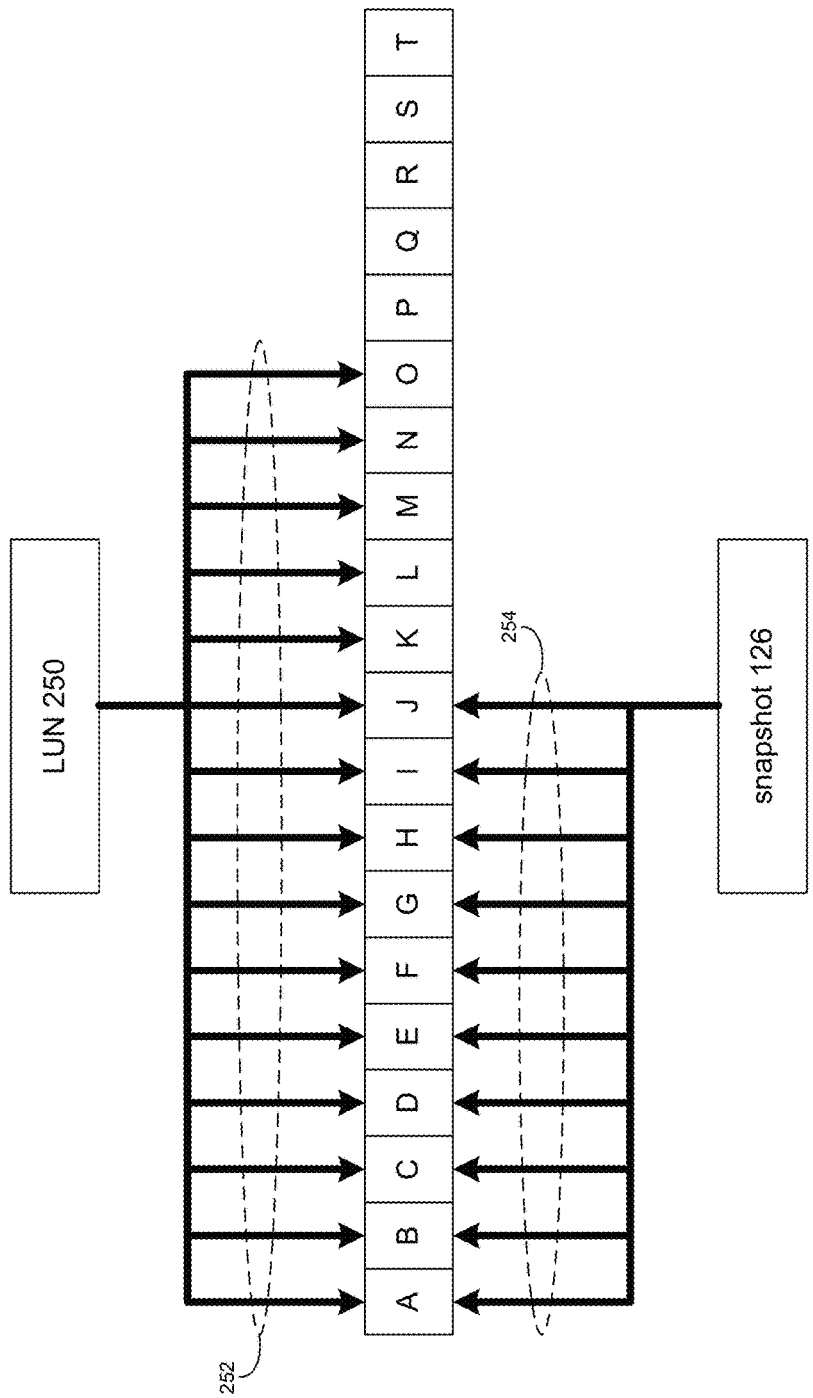

For example and referring also to FIG. 5B, assume that a user writes data to five additional memory blocks (e.g., memory blocks K-O) of LUN 250. Accordingly, pointers 252 defined for LUN 250 may be updated to include five additional pointers that locate the five additional memory blocks. However, pointers 254 defined for snapshot 126 will not change (as they are identifying the status of LUN 250 at the time that snapshot 126 was generated by storage management process 10).

Figure 5C:
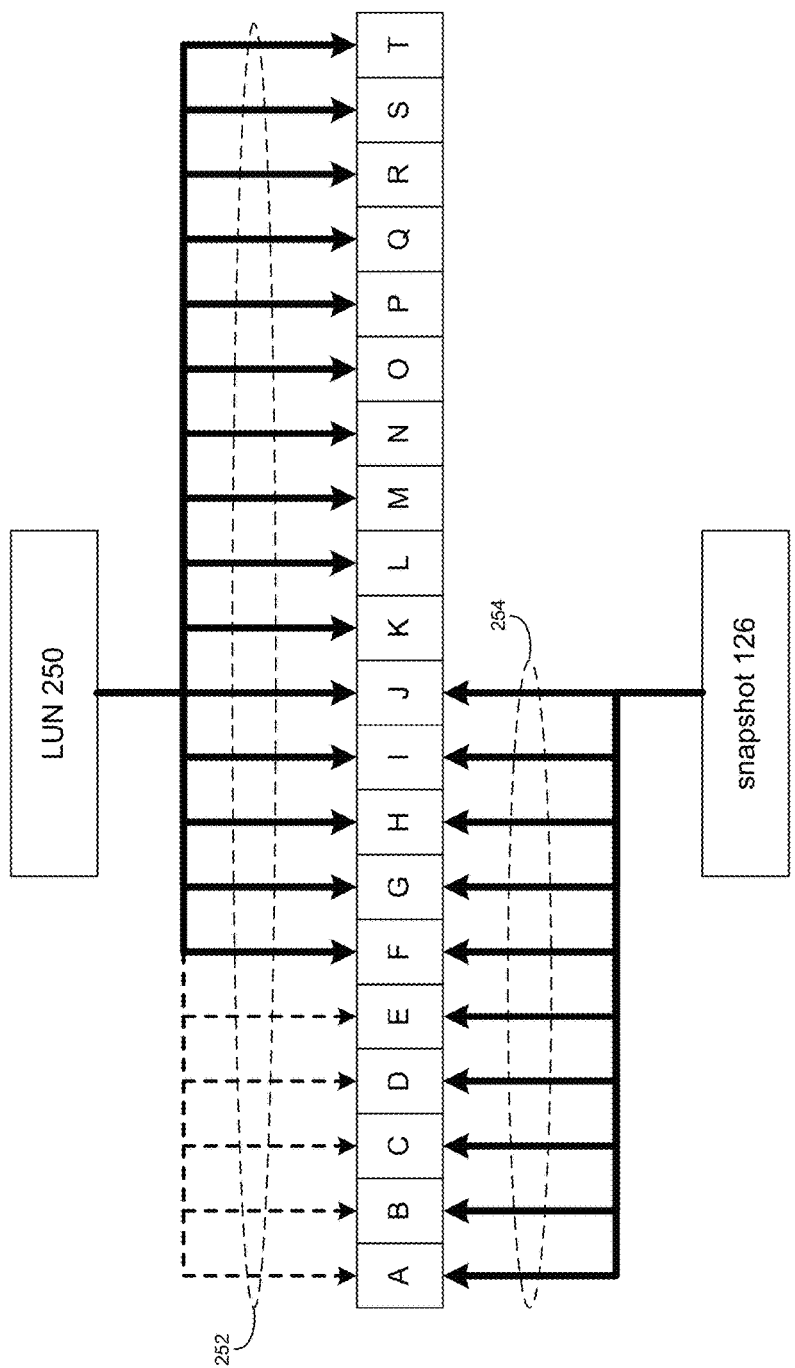

As a further example and referring also to FIG. 5C, assume that the user subsequently overwrites five of the original memory blocks (e.g., memory blocks A-E) of the data included within LUN 250. As snapshot 126 needs to maintain a point-in-time copy of LUN 250 at the time that snapshot 126 was made, storage management process 10 may write this "overwriting" data to new memory blocks (e.g., P-T) so that the original data located in memory blocks A-E may be maintained for subsequent use by snapshot 126 in the event that the user wants to restore LUN 250 to the status defined within snapshot 126. Accordingly, pointers 252 defined for LUN 250 will be updated to include five additional pointers that locate the five additional memory blocks (e.g., memory blocks P-T) and to remove pointers that point to memory blocks A-E. However, pointers 254 defined for snapshot 126 will not change (as they are identifying the status of LUN 250 at the time that snapshot 126 was generated by storage management process 10.

Example #3

Assume for this example, that the LUN to be written to is also a thick LUN (e.g., LUN 118) having a maximum storage capacity of one-thousand memory blocks, of which five-hundred memory blocks are currently being utilized. Since this is a thick LUN, when this LUN was defined by storage management process 10, LUN 118 had an insurance value of one-thousand memory blocks.

Assume that snapshot 126 was generated by storage management process 10 and nothing has changed in LUN 118 since snapshot 126 was taken. Accordingly, only five-hundred memory blocks of the one-thousand memory blocks assigned by storage management process 10 to LUN 118 are currently being used.

Assume for illustrative purposes that storage management process 10 receives 200 a storage operation request (e.g., write request 110) requesting that two-hundred units of storage be written to LUN 118. Accordingly, storage management process 10 may process 202 the storage operation request (e.g., write request 110) to associate a storage liability value with the storage operation request (e.g., write request 110). In this example, the storage liability value is two-hundred units of storage.

Storage management process 10 may then determine 204 whether the storage operation request (e.g., write request 110) should be effectuated based, at least in part, upon the storage liability value (e.g., two-hundred units of storage) of the storage operation request (e.g., write request 110) and the storage insurance value of LUN 118. In this particular example, the storage insurance value of LUN 118 is one-thousand memory blocks (i.e., total capacity of LUN 118)—five-hundred memory blocks (i.e., memory blocks currently being utilized by LUN 118). Accordingly, the currently available insurance value of LUN 118 is five-hundred memory blocks (i.e., the total number of memory blocks still available for use by LUN 118).

When determining 204 whether the storage operation request (e.g., write request 110) should be effectuated, storage management process 10 may determine 206 if additional storage insurance is needed to offset, at least in part, the storage liability value. Since, in this example, the currently available insurance value of LUN 118 is five-hundred memory blocks and the storage liability value is two-hundred units of storage, storage management process 10 may determine 206 that no additional storage insurance is needed. Since no additional storage insurance is not needed, storage management process 10 may effectuate 208 the storage operation request (e.g., write request 110) and write the two-hundred units of storage to (in this example) two-hundred memory blocks (of the remaining five-hundred memory blocks) that are assigned to LUN 118, Example #4

Assume for this example, that the LUN to be written to is also a thick LUN (e.g., LUN 118) having a maximum storage capacity of one-thousand memory blocks, of which eight-hundred memory blocks are currently being utilized. Since this is a thick LUN, when this LUN was defined by storage management process 10, LUN 118 had an insurance value of one-thousand memory blocks.

Assume that snapshot 126 was generated by storage management process 10 and nothing has changed in LUN 118 since snapshot 126 was taken. Accordingly, only eight-hundred memory blocks of the one-thousand memory blocks assigned by storage management process 10 to LUN 118 are currently being used.

Assume for illustrative purposes that storage management process 10 receives 200 a storage operation request (e.g., write request 110) requesting that four-hundred units of data (of the eight-hundred units currently stored on LUN 118) be overwritten. Accordingly, storage management process 10 may process 202 the storage operation request (e.g., write request 110) to associate a storage liability value with the storage operation request (e.g., write request 110). In this example, the storage liability value is four-hundred units of storage (as explained below).

Specifically, LUN 118 currently includes eight-hundred memory blocks of data and two-hundred memory blocks of free space. Since storage management process 10 may be configured to maintain those two-hundred memory blocks of free space for subsequent use by the user of LUN 118 and storage management process 10 would want to maintain a copy of the four hundred memory blocks of data being overwritten within LUN 118 (for future use by snapshot 126), the storage liability value for this storage operation request (e.g., write request 110) is four-hundred memory blocks.

Storage management process 10 may then determine 204 whether the storage operation request (e.g., write request 110) should be effectuated based, at least in part, upon the storage liability value of the storage operation request (e.g., write request 110) and the storage insurance value of LUN 118. In this particular example, the storage insurance value of LUN 118 is one-thousand memory blocks (i.e., total capacity of LUN 118)—eight-hundred memory blocks (i.e., memory blocks currently being utilized by LUN 118)—two-hundred memory blocks (i.e., current free space on LUN 118). Accordingly, the currently available insurance value of LUN 118 is zero memory blocks (i.e., the total number of memory blocks still available for use by LUN 118).

When determining 204 whether the storage operation request (e.g., write request 110) should be effectuated, storage management process 10 may determine 206 if additional storage insurance is needed to offset, at least in part, the storage liability value. Since, in this example, the currently available insurance value of LUN 118 is zero memory blocks and the storage liability value is four-hundred units of storage, storage management process 10 may determine 206 that additional storage insurance (e.g., four-hundred memory blocks) is needed. Since additional storage insurance is needed, storage management process 10 may determine 210 whether the additional storage insurance (e.g., four-hundred memory blocks) is available from storage insurance pool 122 associated with LUN 118.

Accordingly, storage management process 10 may access storage insurance pool 122 to determine 210 if the additional storage insurance (e.g., four-hundred memory blocks) is available. As discussed above, storage insurance pool 122 includes entries 124 that associate the various memory blocks included within plurality of storage targets 104 with the various LUNs to which they are assigned. Accordingly, if there are four-hundred entries that are not associated with memory blocks, the additional storage insurance (e.g., four-hundred memory blocks) is available for use by LUN 118.

If the additional storage insurance is available from storage insurance pool 122, storage management process 10 may obtain 212 the additional storage insurance (e.g., four-hundred memory blocks) from storage insurance pool 122 and may increase 214 the storage insurance value associated with LUN 118 based, at least in part, upon the additional storage insurance (e.g., four-hundred memory blocks). Further, this additional storage insurance (e.g., four-hundred memory blocks) obtained from storage insurance pool 122 is now no longer available within storage insurance pool 122, as this additional storage insurance (e.g., four-hundred memory blocks) is now associated with (in this example) LUN 118. Conversely, in the event that this additional storage insurance (e.g., four-hundred memory blocks) obtained from storage insurance pool 122 is no longer needed by LUN 118 at some point in the future, storage management process 10 may release this additional insurance back to storage insurance pool 122 so that it may be available in the future for use by (in the example) other LUNs.

Storage management process 10 may increase 214 the storage insurance value associated with LUN 118 from one-thousand memory blocks to fourteen-hundred memory blocks. Storage management process 10 may then effectuate 216 the storage operation request (e.g., write request 110).

If the additional storage insurance (e.g., four-hundred memory blocks) is not available from storage insurance pool 122, storage management process 10 may deny 215 the storage operation request (e.g., write request 110). In such a situation, storage management process 10 may give the user associated with the storage operation request (e.g., write request 110) the option of deleting snapshot 126 to free up memory blocks. As discussed above, storage management process 10 may want to maintain a copy of the four hundred memory blocks of data being overwritten within LUN 118 (for future use by snapshot 126). However, if the user elects to delete snapshot 126, the four hundred memory blocks of data being overwritten within LUN 118 may be deleted (instead of being saved for future use by snapshot 126), thus freeing up sufficient memory blocks to effectuate 216 the processing of the storage operation request (e.g., write request 110).

Alternatively, storage management process 10 may be configured to automatically invalidate (e.g., delete) snapshots if the additional storage insurance (e.g., four-hundred memory blocks) is not available from storage insurance pool 122. Specifically, if storage management process 10 seeks authorization from the user to delete snapshots, the storage operation request (e.g., write request 110) in question may likely timeout. Therefore, storage management process 10 may be configured to automatically delete snapshots if needed (e.g., due to the unavailability of additional storage insurance) in the event that the LUN in question is a thickly-provisioned LUN and the additional storage space is needed to meet the maximum capacity of the thick LUN (e.g., one-thousand memory blocks).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   receiving a storage operation request for a logical storage object, wherein a storage insurance value is associated with the logical storage object, wherein the storage insurance value is associated with an assignment of memory blocks within the logical storage object, wherein the storage insurance value is a total logical capacity assigned to the logical storage object minus a currently utilized portion of the total logical capacity assigned to the logical storage object and a snapshot portion of the total logical capacity assigned to the logical storage object, wherein the currently utilized portion of the total logical capacity assigned to the logical storage object includes one or more memory blocks currently storing data and the snapshot portion includes one or more memory blocks referenced by a snapshot of the logical storage object when the storage operation request includes overwriting the one or more memory blocks referenced by the snapshot of the logical storage object from the currently utilized portion;
   processing the storage operation request to associate a storage liability value with the storage operation request; and
   determining whether the storage operation request should be effectuated based, at least in part, upon the storage liability value and the storage insurance value.

2. The computer-implemented method of claim 1 wherein determining whether the storage operation request should be effectuated includes:
   determining if additional storage insurance is needed to offset, at least in part, the storage liability value.

3. The computer-implemented method of claim 2 further comprising:
   if additional storage insurance is not needed, effectuating the storage operation request.

4. The computer-implemented method of claim 2 further comprising:
   if additional storage insurance is needed, determining whether the additional storage insurance is available from a storage insurance pool associated with the logical storage object.

5. The computer-implemented method of claim 4 further comprising:
   if the additional storage insurance is available from the storage insurance pool, obtaining the additional storage insurance from the storage insurance pool;
   increasing the storage insurance value associated with the logical storage object based, at least in part, upon the additional storage insurance; and
   effectuating the storage operation request.

6. The computer-implemented method of claim 4 further comprising:
   if the additional storage insurance is not available from the storage insurance pool, denying the storage operation request.

7. The computer-implemented method of claim 1 wherein the logical storage object is chosen from a group consisting of a thin Logical Unit Number (LUN) and a thick LUN.

8. A computer program product residing on a non-transitory computer readable medium having a plurality of instructions stored thereon which, when executed by a processor, cause the processor to perform operations comprising:
   receiving a storage operation request for a logical storage object, wherein a storage insurance value is associated with the logical storage object, wherein the storage insurance value is associated with an assignment of memory blocks within the logical storage object, wherein the storage insurance value is a total logical capacity assigned to the logical storage object minus a currently utilized portion of the total logical capacity assigned to the logical storage object and a snapshot portion of the total logical capacity assigned to the logical storage object, wherein the currently utilized portion of the total logical capacity assigned to the logical storage object includes one or more memory blocks currently storing data and the snapshot portion includes one or more memory blocks referenced by a snapshot of the logical storage object when the storage operation request includes overwriting the one or more memory blocks referenced by the snapshot of the logical storage object from the currently utilized portion;
   processing the storage operation request to associate a storage liability value with the storage operation request; and
   determining whether the storage operation request should be effectuated based, at least in part, upon the storage liability value and the storage insurance value.

9. The computer program product of claim 8 wherein determining whether the storage operation request should be effectuated includes:
   determining if additional storage insurance is needed to offset, at least in part, the storage liability value.

10. The computer program product of claim 9 further comprising:
   if additional storage insurance is not needed, effectuating the storage operation request.

11. The computer program product of claim 9 further comprising:
   if additional storage insurance is needed, determining whether the additional storage insurance is available from a storage insurance pool associated with the logical storage object.

12. The computer program product of claim 11 further comprising:
   if the additional storage insurance is available from the storage insurance pool, obtaining the additional storage insurance from the storage insurance pool;
   increasing the storage insurance value associated with the logical storage object based, at least in part, upon the additional storage insurance; and
   effectuating the storage operation request.

13. The computer program product of claim 11 further comprising:
   if the additional storage insurance is not available from the storage insurance pool, denying the storage operation request.

14. The computer program product of claim 8 wherein the logical storage object is chosen from a group consisting of a thin Logical Unit Number (LUN) and a thick LUN.

15. A computing system including at least one processor and at least one memory architecture coupled with the at least one processor, wherein the computing system is configured to perform operations comprising:
   receiving a storage operation request for a logical storage object, wherein a storage insurance value is associated with the logical storage object, wherein the storage insurance value is associated with an assignment of memory blocks within the logical storage object, wherein the storage insurance value is a total logical capacity assigned to the logical storage object minus a currently utilized portion of the total logical capacity assigned to the logical storage object and a snapshot portion of the total logical capacity assigned to the logical storage object, wherein the currently utilized portion of the total logical capacity assigned to the logical storage object includes one or more memory blocks currently storing data and the snapshot portion includes one or more memory blocks referenced by a snapshot of the logical storage object when the storage operation request includes overwriting the one or more memory blocks referenced by the snapshot of the logical storage object from the currently utilized portion;
   processing the storage operation request to associate a storage liability value with the storage operation request; and
   determining whether the storage operation request should be effectuated based, at least in part, upon the storage liability value and the storage insurance value.

16. The computing system of claim 15 wherein determining whether the storage operation request should be effectuated includes:
   determining if additional storage insurance is needed to offset, at least in part, the storage liability value.

17. The computing system of claim 16 further configured to perform operations comprising:
   if additional storage insurance is not needed, effectuating the storage operation request.

18. The computing system of claim 16 further configured to perform operations comprising:
   if additional storage insurance is needed, determining whether the additional storage insurance is available from a storage insurance pool associated with the logical storage object.

19. The computing system of claim 18 further configured to perform operations comprising:
   if the additional storage insurance is available from the storage insurance pool, obtaining the additional storage insurance from the storage insurance pool;
   increasing the storage insurance value associated with the logical storage object based, at least in part, upon the additional storage insurance; and
   effectuating the storage operation request.

20. The computing system of claim 18 further configured to perform operations comprising:
   if the additional storage insurance is not available from the storage insurance pool, denying the storage operation request.

* * * * *